Oct. 27, 1959     L. BODDY     2,910,650
POLARITY SENSITIVE BIMETAL AMMETER AND VOLTMETER
Filed March 22, 1956

INVENTOR.
Leonard Boddy
BY
Harness, Dickey & Pierce
ATTORNEYS.

United States Patent Office 2,910,650
Patented Oct. 27, 1959

2,910,650

POLARITY SENSITIVE BIMETAL AMMETER AND VOLTMETER

Leonard Boddy, Ann Arbor, Mich., assignor to King-Seeley Corporation, Ann Arbor, Mich., a corporation of Michigan Application March 22, 1956, Serial No. 573,112

4 Claims. (Cl. 324—133)

This invention relates to electrical instruments such as ammeters and voltmeters.

An object of this invention is to measure the magnitude of direct voltages and currents and to indicate the polarity of the source or the direction of the current.

Another object of this invention is to measure pulsating or intermittent direct voltages and currents, with an indication of the polarity of the source or the direction of the current.

Another object of this invention is to reduce the cost of manufacture and maintenance of instruments for measuring both the magnitude and the polarity of a voltage or both the magnitude and the direction of flow of current.

A feature of this invention is a highly damped bi-directional electrical instrument.

Instruments manufactured in accordance with the herein enunciated principles may be applied to the measurement of voltages and currents in any selected environment. As an illustration, devices having the capabilities of the herein disclosed instruments may be applied to the measurement of the varying voltages and currents in an automobile's electrical system. Thus, it has been customary for many years to provide an ammeter on the instrument panel for indicating the magnitude and direction of flow of battery current. In the conventional battery-generator-regulator arrangement, both the magnitude and the direction of this current varies, the flow being either in a direction to charge or to discharge the battery. Hence, the ammeter must be capable of indicating both the magnitude and the direction of the current.

Additionally, the magnitude of the current may change abruptly or may undergo a series of short-duration shifts in value. With customary instrumentation, an abrupt change in current tends to induce a damped oscillatory movement of the meter needle. Unless the observer is willing to perform a visual integration of the needle swings, he must await the return of that needle to stability before interpreting its indication. Similarly, in automotive use, the short-duration, transient current changes resulting, for example, from operations of the system's regulator or turn indicators are of little or no interest. Consequently, it is highly desirable that the meter movement be quite highly damped so that the position of the meter needle will not reflect short-duration transient changes in current and so that the needle will effectively integrate repetitive transient changes.

In accordance with the teachings herein presented, an electrothermal meter is so arranged that the needle will be deflected in one or other of two directions in response to which of two heater windings is energized, means being provided to direct the current through but one of the two windings in accordance with the direction of the current flow. The movement may be selectively damped to substantially any desired degree by appropriate selection of the electrothermal parameters. The mechanism, obviously, is adapted to voltage measurements, with the capability of polarity sensitivity.

The manner of accomplishment of the foregoing objects, the detailed nature of the foregoing feature and other objects and features of the invention, will be perceived from the following detailed description of an embodiment of the invention when read with reference to the accompanying drawings, in which.

Figure 1:
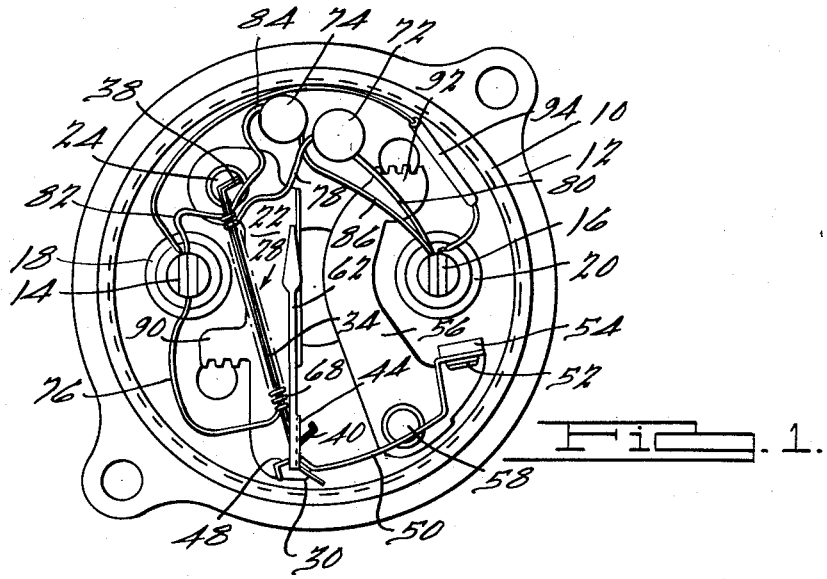
Figure 1 is a front elevational view, with the cover plate and indicator scale removed, of an instrument embodying the principles of the present invention.

The principles of the invention have representatively been applied to a structure certain of the basic elements of which are similar to indicators of the type employed in automotive fuel, oil pressure, and coolant temperature gauges.

The unit comprises a generally cup-shaped casing 10 mechanically integral with a base plate 12. The instrument is a two terminal device, being provided with metallic terminals 14 and 16 secured to the casing 10 but insulated therefrom by means such as insulators 18 and 20. In practice, if casing 10 and base plate 12 are formed separately, insulators 18 and 20 may be unitary and interposed casing 10 and base plate 12, and terminals 14 and 16 may be appropriately formed to serve as the means for securing the casing 10 to the base plate 12.

A support arm 22 is mounted near one end to the casing 10 by means such as rivet 24 which serves to prevent accidental rotational motion of support arm 22 but permits intentional rotation of that arm on the application of a sufficient rotational moment thereto.

Figure 2:
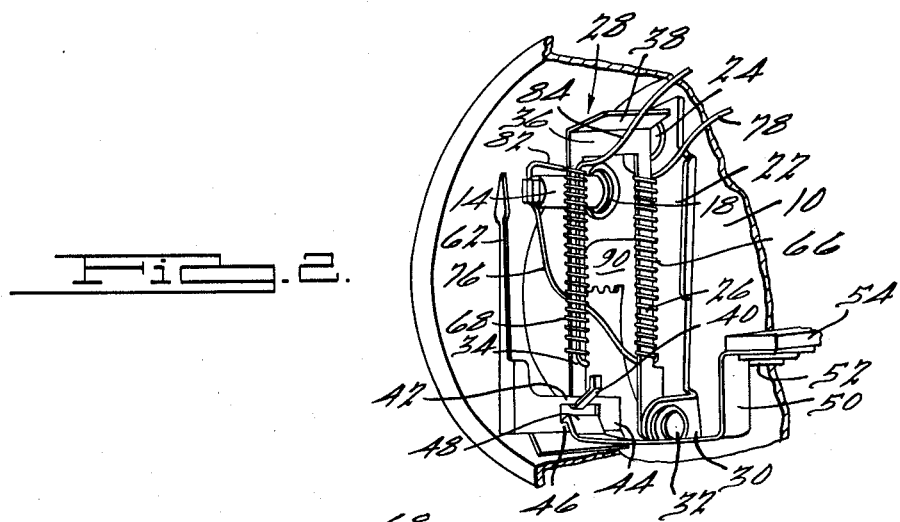
Fig. 2 is a fragmentary perspective view of the instrument of Fig. 1.

One end of leg 26 (Fig. 2) of polymetallic element 28 is secured to a projecting flange 30 on the support arm 22 by an appropriate means such as a rivet 32. With the shown arrangement, it is not imperative that the bi-metallic element 28 be electrically insulated from the support arm 22, although in other arrangements this may be desirable if the polymetallic element 28 is employed as an element of the electrical measuring circuitry.

Element 28 representatively comprises a pair of spaced apart legs 26 and 34, the face surfaces of which are or may be normally substantially coplanar and the edge surfaces of which are or may be normally parallel. Legs 26 and 34 are interjoined by a cross member 36 which is preferably provided with an upstanding flange 38 serving effectively to prevent bending of crosspiece 36 either as a result of the mechanical motion of either of the legs 26 and 34 or as the result of application of heat thereto. The entire element 28 is conveniently formed from a sheet of laminated polymetallic material, the material defining one face of the element 28 having a different temperature coefficient of expansion than the metal constituting the opposing face. While element 28 is normally bimetallic, it may under certain circumstances be advisable to employ a trimetallic element including a central layer of high electrical conductivity metal if the element 28 is to be employed as an element of the measuring circuitry.

Element 28 is supported essentially as a cantilever, with rivet 32 serving as the point of support, and with leg 26 supporting leg 34 through the medium of crosspiece 36. While the metal having the lower temperature coefficient of linear expansion may be placed upon either face in practice, it is assumed for purposes of description that that metal is on the face which may be seen in Fig. 2 of the drawings. Consequently, if leg 26 is heated, it will tend to bend, approximately in an arc, with the end thereof remote from the rivet 32 moving clockwise or to the right in the view of Fig. 1. The resultant curvature of leg 26 will tend not only to shift the position but also the plane of crosspiece 36. Assuming that the temperature of leg 34 is not changed, that leg will remain in the same planar disposition with respect to the crosspiece 36 so that its lower end will be deflected in a clockwise direction or to the left in the view of Fig. 1. Conversely, if leg 26 is not heated so that crosspiece 36 remains in its shown position, but leg 34 is heated, leg 34 will tend to bend, with its lower end moving in a counterclockwise direction or to the right in the view of Fig. 1. Hence, heating of leg 26 tends to move the lower end of leg 34 in a direction opposite to the direction of the movement resulting from the heating of leg 34. It will be appreciated that ambient temperature compensation may be achieved by so designing the instrument that equal heating of legs 26 and 34 will produce no motion of the lower end of leg 34, the effects of the heating of the two legs 26 and 34 counteracting one another.

The lower end of the leg 34 is bent sharply upwardly to define a V-notch hook portion 40. The upper horizontal leg 42 of a thin metallic frame 44 is seated in the apex of the hook portion 40 so that the frame 44 is suspended from and supported by the polymetallic element 28.

The lower horizontal leg 46 of the frame portion 44 is seated in the apex of the V-notch hook portion 48 of a tensor or spring strip 50. The other end of spring strip 50 is secured, as by a rivet 52, to a perpendicular projection 54 on support arm 56. Support arm 56 is secured to the casing 10 by a rivet 58, and preferably has substantially the same rotational capabilities as the support arm 22. The assembly of tensor or spring strip 50, frame 44 and polymetallic element 28 is designed so that the legs 42 and 46 of the frame portion 44 are held seated in the hook portions 40 and 48 due to a slight, continuing yieldable downward force exerted by the tensor 50. It will be perceived that movement of the lower end of leg 34 of polymetallic element 28 will tend to tilt frame portion 44 about an axis of rotation comprising the line of engagement between the horizontal leg portion 46 thereof and the hook portion 48. Hence, needle 62, affixed to or formed integrally with frame portion 44, will be rotated about that same axis.

The legs 26 and 34 of the polymetallic element 28 may be effectively individually heated by the provision of individual, insulated heater coils 66 and 68, respectively, wound thereon. Since coils 66 and 68 are formed of resistance wire, passage of current through the wire will produce a heating effect equal to the product of the square of the magnitude of that current times the value of the resistance of the coil. A portion of this heat is transmitted to the individual leg 26 or 34, producing a corresponding elevation of the temperature of that leg and a resultant deflection of the leg. As is inherent in thermal devices of this type, there is a delay between the initiation or increase of the magnitude of the current through the coil and the completion of the deflection of the polymetallic leg in response thereto, and conversely, there is a delay between the termination or reduction of the magnitude of the current through the coil and the resultant total or partial straightening of the polymetallic leg.

Obviously, the degree and direction of deflection of polymetallic leg 26 or 34 will be the same regardless of the direction of flow of the current through the coil 66 or 68, respectively, associated therewith. In order to imbue the instrument with the capability of detecting and indicating the direction of current flow, not only are two windings required, but also means are provided for selectively directing current flow through the two wires in accordance with the direction of current flow in the external circuit with which the instrument is associated. This means comprises a pair of small, instrument-type unidirectional current conducting devices 72 and 74. These devices, which may be of any appropriate type such as small dry-disk rectifiers, crystal diodes, semiconductor elements, etc., may, in commercial practice, be formed as an integral, three-terminal structure, as is well known in the art.

Unidirectional current conducting device 72 is individual to heater winding or coil 66 and device 74 is individual to heating coil 68. There are two parallel circuits through the instrument, one extending from terminal 14, wire 76, coil 66, wire 78, unidirectional current conducting device 72, and wire 80 connected to terminal 16. The other circuit may be traced from terminal 14, wire 82, coil 68, wire 84, unidirectional current conducting device 74, and wire 86 which is connected to terminal 16. It will be noted that wires 76 and 78 may be and desirably are integral with an extension of the wire forming the coil 66 and that wires 82 and 84 are similarly integral with the wire forming coil 68.

Figure 3:
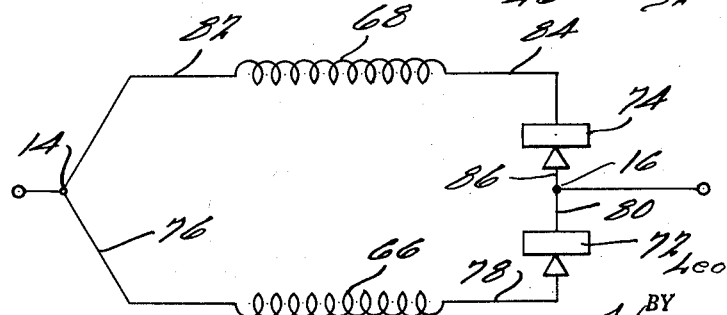
Fig. 3 is a schematic representation of the circuit of the instruments of Figs. 1 and 2.

As may best be seen in Fig. 3 of the drawings, the polarity of the devices 72 and 74 is so arranged that device 74 will present a low impedance to current attempting to flow from terminal 16 to terminal 14 and a high impedance to current attempting to flow from terminal 14 to terminal 16, whereas device 72 will, reversely, present a high impedance to current attempting to flow from terminal 16 to terminal 14 and a low impedance to current attempting to flow from terminal 14 to terminal 16. Hence, substantially all of the current flow from terminal 14 to terminal 16 will be through heater winding 66 whereas substantially all of the current flow from terminal 16 to terminal 14 will be through heater winding 68. Under the representative arrangement, flow of current through winding 66 will move needle 62 in a counterclockwise direction whereas current through winding 68 will move needle 62 in a clockwise direction.

The instrument may be tailored to provide a rectilinear or any other desired relationship between the amplitude of the current through winding 66 or 68 and the position of the needle 62, the possibilities for such design tailoring including the modification of the resistance of the coils 66 and 68, the modification of the materials in the bimetallic element or the mass thereof, the length of the legs 26 and 34, the angle between those legs and the crosspiece 36, the temperature coefficient of resistivity of the coils 66, and many other such factors which will be obvious to those skilled in the art. After manufacture and assembly, some adjusting means such as that disclosed may be employed to compensate for manufacturing variations or for variations in the calibration of the instrument with time and use. Thus, a toothed tool may be engaged with the rack 90 on support arm 22 to shift that arm and hence to shift the position of the lower end of leg 26 of polymetallic element 28 so as to shift the zero reading of the instrument, and that tool may be engaged with rack 92 on support arm 56 to adjust the needle 62 to read full scale at any appropriate selected current amplitude.

As noted, the instrument is adapted to be used in the measurement of either direct or pulsating direct voltages and currents and is particularly suited by virtue of its thermal lag characteristics, for presenting a representation of an integrated value of a varying current or voltage.

If the instument is employed as an ammeter, it may be desirable or necessary to provide a meter shunt in accordance with customary ammeter practices. Such a shunt 94 is representatively shown in Fig. 1 of the drawings, extending between terminals 14 and 16 and disposed physically within the casing 10, meter shunt 94 being represented as a cylindrical, low-value resistor merely for convenience of illustration. If the instrument is employed as a voltmeter, it may be desirable to provide a multiplier resistor in series with the instrument and this multiplier may also be mounted within the casing 10 and appropriately interconnecting it with the other elements such as by employing terminal 14 or 16 as an internal instrument terminal and extending the multiplier resistor between that terminal and an added output terminal. It may be noted that while it is not necessary that the meter shunt or multiplier resistor be placed internally of the casing 10, it is feasible to do so, so long as the unidirectional current conducting devices 72 and 74 are not overheated, since the polymetallic element 28 is or may be ambient temperature compensated, as noted. The disclosed position of the bimetallic element 28 is but representative of a number of suitable arrangements.

To facilitate the establishing of symmetrical sensitivity, with equal currents of opposite directions producing opposite but equal needle deflections, the element 28 may be positioned in alignment with the zeroed indicator needle, that is, in a vertical plane in the view of Fig. 1.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A thermally responsive device for use in a direct current circuit and variably responsive to the polarity of the direct current comprising a pair of terminals connectable to the direct current circuit, first and second elongated polymetallic portions, one end of said first portion being joined to one end of said second portion, means fixing the other end of said first portion, said device being characterized in that heat applied to said first portion tends to cause the other end of said second portion to deflect in one direction and heat applied to said second portion tends to cause said other end thereof to deflect in a direction opposite to said one direction, separate means for separately and controllably heating said first and second portions, a unidirectional current conducting device individual to each of said separate means, and means connecting each of said devices in series with its individual separate means between said terminals, said unidirectional current conducting devices being oppositely poled so that current will be directed to one or the other of said separate means in accordance with the direction of current flow.

2. A thermally responsive device for use in a direct current circuit and variably responsive to the polarity of the direct current comprising first and second elongated polymetallic portions, one end of said first portion being joined to one end of said second portion, means fixing the other end of said first portion, said device being characterized in that heat applied to said first portion tends to cause the other end of said second portion to deflect in one direction and heat applied to said second portion tends to cause said other end thereof to deflect in a direction opposite to said one direction, a pair of terminals connectable to elements of an external circuit, separate means for separately and controllably heating said first and second portions, a unidirectional current conducting device individual to each of said separate means and connected in series therewith between said terminals, said unidirectional current conducting devices being oppositely poled so that current flowing from one of said terminals to the other will flow primarily through one of said separate means and so that current flowing from said other terminal to said one terminal will flow primarily through the other one of said separate means.

3. A thermally responsive device for use in a direct current circuit and variably responsive to the polarity of the direct current comprising a pair of terminals connectable to the direct current circuit, first and second elongated polymetallic thermally bendable portions, means fixing one end of said first portion, means interjoining the other end of said first portion and one end of said second portion, heater means in heat transfer relation with said first portion for bending said first portion to tend to move the other end of said second portion in one direction, heater means in heat transfer relation with said second portion for bending said second portion to tend to move said other end of said second portion in a direction opposite to said one direction, a unidirectional current conducting device individual to each of said heater means, and means connecting each of said devices in series with its individual heater means between said terminals, said unidirectional current conducting devices being oppositely poled so that current will be directed to one or the other of said heater means in accordance with the direction of current flow.

4. An electrothermal polarity-sensitive electrical instrument for use in a direct current circuit and variably responsive to the polarity of the direct current comprising bidirectionally deflectable means, first polymetallic thermally deflectable means effective when heated to move said bidirectionally deflectable means in one direction, second polymetallic thermally deflectable means effective when heated to move said bidirectionally deflectable means in the other direction, first and second electrical resistance heating means in heat transfer relationship with individual ones of said polymetallic thermally deflectable means, a pair of terminals connectable to the direct current circuit, a pair of unidirectional current conducting means for controlling the flow of current through said heating means, circuit means connecting one of said unidirectional current conducting means in series with said first winding between said terminals, and circuit means connecting the other one of said unidirectional current conducting means in series with said second heating means between said terminals, one of said unidirectional current conducting means permitting current of but one polarity to pass through one of said heating means, the other one of said unidirectional current conducting means permitting current of but the other polarity to pass through the other one of said heating means.

References Cited in the file of this patent
UNITED STATES PATENTS

| | | |
|---|---|---|
| 1,881,884 | Noble | Oct. 11, 1932 |
| 1,971,899 | Buttolph | Aug. 28, 1934 |
| 2,303,217 | Malone | Nov. 24, 1942 |
| 2,424,243 | Lowell | July 22, 1947 |
| 2,454,393 | Leonard | Nov. 23, 1948 |